United States Patent Office 2,775,613
Patented Dec. 25, 1956

2,775,613

METHANE-BIS(VANILLIN) AND DERIVATIVES AND PROCESSES FOR PREPARING THE SAME

John D. Garber, Cranford, N. J., assignor to Merck & Co., Inc., Rahway, N. J., a corporation of New Jersey No Drawing. Application March 15, 1954,
Serial No. 416,430

5 Claims. (Cl. 260—479)

This invention relates to novel vanillin derivatives and processes of obtaining the same. Specifically, it is concentrated with methane-bis(vanillin), derivatives thereof, and methods of preparing these products.

In accordance with this invention, it is now found that the condensation product of vanillin and formaldehyde of the formula

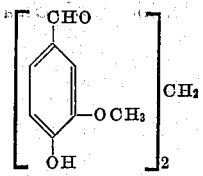

which is herein called methane-bis(vanillin) or bis(2-hydroxy-3-methoxy-5-formyl phenyl) methane, the acyloxy derivatives thereof (bis(2 - acyloxy - 3 - methoxy-5-formyl phenyl)methane) and the corresponding nitro vinyl derivative (bis(2-hydroxy-3-methoxy-5-nitro vinyl phenyl)methane) are valuable new organic compounds. These products are useful in the field of organic chemistry as intermediates in the preparation of other valuable compounds, and, in particular, in the field of agricultural chemistry as plant growth regulating compounds.

It is an object of the present invention to provide methane-bis(vanillin), derivatives thereof, and methods of preparing the same. Other objects will be apparent from the detailed description hereinafter provided.

Pursuant to one embodiment of my invention, I have found that methane-bis(vanillin) is obtained by reacting vanillin with formaldehyde in the presence of an alkali metal hydroxide in accordance with the following reaction:

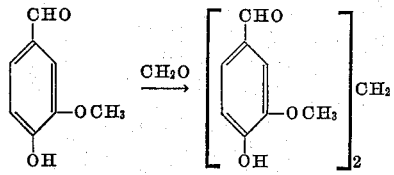

This condensation of vanillin and formaldehyde is preferably carried out by adding an alkali metal hydroxide in an amount in excess of that required to form the sodium salt of vanillin to a concerned aqueous solution of the reactants at elevated temperatures with vigorous agitation. Thus, the reaction is most conveniently effected by heating an aqueous solution of vanillin and formaldehyde under reflux to about 100° C. and gradually adding a solution of sodium hydroxide in water. After the addition of the sodium hydroxide is complete, the mixture is heated under reflux for sufficient time to insure completion of the reaction. When the reaction is complete, the resulting mixture is acidified with a dilute mineral acid thereby causing the condensation product to precipitate from solution. The precipitated product is then readily purified by extraction with acetone and recrystallization to obtain the methane-bis(vanillin) in substantially pure form.

In accordance with another embodiment of my invention, it is found that the vanillin-formaldehyde condensation product is readily converted to the corresponding acyl derivatives by reaction with an acid anhydride. Although various acyl derivatives can be prepared by this method, I have found that the lower fatty acid esters of this condensation product are particularly valuable and are readily prepared by reacting the methane-bis(vanillin) with a lower fatty acid anhydride. Thus, reaction of the bisphenol obtained by the reaction of vanillin and formaldehyde with acetic anhydride for two hours under reflux yields the corresponding acetate ester (bis(2-acetoxy-3-methoxy-formyl phenyl) methane).

Pursuant to a further embodiment of my invention, I have found that another important derivative of this vanillin derivative is prepared by reacting nitro methane with methane-bis(vanillin). The 5-nitrovinyl derivative so obtained also possesses valuable growth regulating properties. The preparation of this derivative is most conveniently effected by heating methane-bis(vanillin) with nitro methane at elevated temperatures. Thus, the reaction is effected by heating methane-bis(vanillin) with an excess of nitro methane under reflux until the formation of the derivative is complete. I have also found that it is advisable in order to speed up the reaction to add a small amount of ammonium acetate or an alkali metal acetate to the reaction mixture.

The novel compounds of the present invention are valuable growth regulating products. Thus, in the standard cucumber seed germination test, it was observed that a significant decrease in the length of the roots and stem of germinated seeds previously incubated at 43° C. for 72 hours in water containing 100 parts per million by weight of bis(2-acetoxy-3-methoxy-5- formyl phenyl) methane occurred when compared with untreated cucumber seeds used as a control.

The following examples are presented to illustrate methods of preparing the novel compounds of the present invention.

EXAMPLE 1

Methane-bis(vanillin)

177 g. (1.17 mols.) of vanillin and 5.5 g. (0.64 mol.) of 35% formaldehyde were heated under reflux to 100° C. and the addition of 50 g. (1.25 mols.) of NaOH dissolved in 50 ml. of H₂O was begun. The high temperature and/or violent agitation uesd apparently caused instantaneous reaction and prevented precipitation of the sodium salt of vanillin. When addition of caustic was complete the reaction mixture was refluxed for 30 minutes, poured into 2500 ml. of H₂O at 80° C. and acidified with 500 ml. of 7% HCl solution. Any unreacted vanillin should be soluble under these conditions. The precipitated solid was filtered off, yield 70.0 g. (dry), and samples of two types of crystals were separated, M. P. 150–155 and 260–264° C.

Extraction of the crude solid with acetone yielded 22.0 g. dry residue, M. P. 273–274° C. This white powder was dissolved in the minimum quantity of 10% caustic, diluted to one liter and reprecipitated by the addition of one liter of H₂O containing 33 g. conc. HCl. The filtered solid was washed with water and acetone and dried to yield 21.0 g. of methane-bis(vanillin) in the form of a fine white powder, M. P. 274° C.

Carbon: calculated 64.53; found 64.86.
Hydrogen: calculated 5.09; found 5.60.

EXAMPLE 2

*Methane, bis (2-acetoxy-3-methoxy-5-formyl phenyl)*

One gram of the bisphenol obtained from vanillin and formaldehyde was suspended in 20 ml. of acetic anhydride and refluxed for 2 hours to obtain a clear yellow solution. The crude product was recovered by decomposition in water followed by recrystallization of the crude precipitate from 50% aqueous ethanol. The yield of white crystalline product, methane, bis(2-acetoxy-3-methoxy-5-propyl phenyl) was 0.5 g., M. P. 112–113° C.

EXAMPLE 3

*Methane, bis (2-hydroxy-3-methoxy-5-β-nitrovinyl phenyl)*

Three grams of methane, bis(2-hydroxy-3-methoxy-5-formyl phenyl) obtained by the alkaline condensation of vanillin and formaldehyde was dispersed in 50 ml. of nitromethane and refluxed for 15 minutes. No solution occurred hence 1.0 g. of ammonium acetate was added and the suspension again refluxed. After a short time a clear, red solution had formed. After two hours under reflux the reaction mixture was allowed to cool, filtered and recrystallized from $CH_3NO_2$ using carbon. The yield of yellow needles of methane, bis(2-hydroxy-3-methoxy-5-nitrovinyl phenyl) was 1.2 g., M. P. above 250° C. although a definite decomposition occurred at 200° C.

Analysis for $C_{19}H_{18}O_8N_2$: Nitrogen—calculated 6.97; found 6.75.

Various changes and modifications in the procedures herein disclosed will occur to those skilled in the art, and to the extent that such changes and modifications are embraced by the appended claims, it is to be understood that they constitute part of my invention.

I claim:
1. A member from the group consisting of bis(2-hydroxy-3-methoxy-5-formyl phenyl) methane and bis (2-acyloxy-3-methoxy-5-formyl phenyl) methane, wherein the acyl substituent is a lower fatty acid radical.
2. Bis(2-hydroxy-3-methoxy-5-formyl phenyl) methane.
3. Bis(2-acyloxy-3-methoxy-5-formyl phenyl) methane wherein the acyl substituent is a lower fatty acid radical.
4. Bis(2-acetoxy-3-methoxy-5-formyl phenyl) methane.
5. Bis(2-hydroxy-3-methoxy-5-nitrovinyl phenyl) methane.

References Cited in the file of this patent
UNITED STATES PATENTS 2,644,822  Pearl _____ July 7, 1953

OTHER REFERENCES

Hickinbottom: "Reactions of Organic Compounds," page 126 (1948).